2,823,979
METHOD OF MAKING PIGMENT

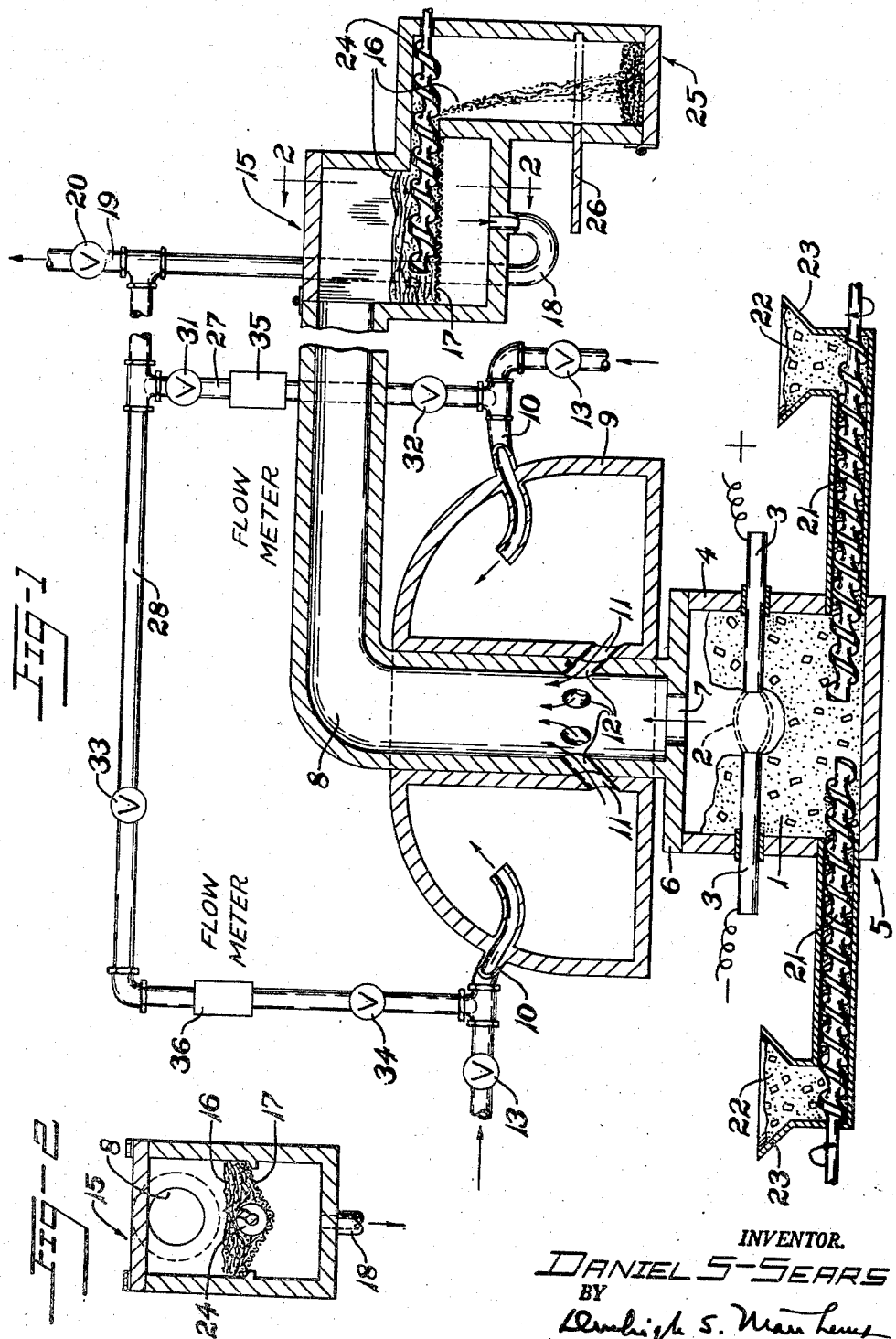

Daniel S. Sears, Henrico County, Va., assignor to The B. F. Goodrich Company, New York, N. Y., a corporation of New York Application May 28, 1954, Serial No. 433,020

14 Claims. (Cl. 23—182)

This invention relates to a method for preparing oxygen-silicon containing compounds. More specifically, this invention relates to a method for preparing finely-divided, substantially fibrous solid silicon monoxide having a high surface area and being particularly useful as a reinforcing agent for rubber.

When sand and coke are heated to a high temperature by means of an electric arc, there is formed a product volatile at this high temperature which has the composition SiO. When this product is allowed to condense to the solid state in a vacuum, there is formed a brown pigment disclosed by Potter in Transactions of the American Electro-Chemical Society, vol. XII, 1907, pages 191 to 228, and in U. S. Patents 875,286, 875,675 and 1,104,-384 and by Tone in U. S. Patent 993,913. This material has been alleged to be silicon monoxide and has been called "monox" by Potter. It collects in an ultra fine state of subdivision and comprises a substantial proportion of fibrous particles having an average particle length of about 50 to 600 millimicrons and a surface area of about 60 to 200 square meters per gram. The ratio of the width to length of the fibrous particles may vary from about 1 to 10 to 1:50. Spherical and horn-like particles are present in the mixture in a minor amount and have an average particle size of about 5 to 200 mu and a surface area of up to 300 m.²/g. A method for obtaining silicon monoxide substantially or essentially spherical in shape including its use and the use of fibrous silicon monoxide as a reinforcing pigment in rubbery materials is also set forth in copending application of Edwin B. Newton and Daniel S. Sears, Serial No. 433,291 entitled "Reinforcement of Rubber" and filed of even date. Recent studies have shown that "monox" is not silicon monoxide but a condensed disproportionation product of gaseous silicon monoxide, which exists only at high temperatures, and is more correctly represented by the formula $[(Si)_x \cdot (SiO_2)_y]$ where $x$ and $y$ are whole numbers.

In the processes described in the prior art the silicon monoxide gas produced in the furnace by the reaction of coke and sand at temperatures of 1500° C. and higher was allowed to rush forth in a turbulent manner into a chamber which had been evacuated and cooled on its surface to condense the silicon monoxide gas. The resulting product as described above contained a substantial proportion of fibrous particles mixed with a minor amount of spherical and horn-like particles. However, these spherical and horn-like particles do not contribute substantially to the reinforcement of rubbery materials as compared to fibers. But with the apparatus and method of the prior art, it is not possible to readily control their amount or formation and to maintain the amount of fibers constant since the furnace efficiency and pressure of gases produced decreases while the vacuum is reduced during operation. Moreover, the processes of the prior art were batch type processes which do not lend themselves well to commercial practice due to the necessity of removing the product formed, removing the fused sand-coke mixture from the cooled furnace, recharging and evacuating the condensing chamber for each run. Furthermore, the apparatus used required careful sealing to maintain the vacuum and avoid ingress of air which would tend to oxidize the silicon monoxide to silicon dioxide gas. Accordingly, it is a primary object of the present invention to provide a method for controlling the particle size of the silicon monoxide obtained to provide a solid, particulate silicon monoxide exhibiting an increased amount of fibers as compared to spherical and horn-like particles.

It is another object of this invention to provide a method for continuously producing solid silicon monoxide which exhibits a high ratio of fibers to spherical particles and in which the fibers are longer and more tendrilous than heretofore obtained.

Yet another object of this invention is to produce solid silicon monoxide at substantially atmospheric pressures.

These and other objects and advantages of the present invention will become more apparent to those skilled in the art from the following detailed description, examples and drawing wherein;

Fig. 1 is a diagrammatic arrangement of apparatus for producing solid, particulate, condensed, substantially fibrous silicon monoxide according to the present invention, and Fig. 2 is a vertical sectional view along the lines 2—2 of Fig. 1.

It has now been discovered according to the present invention that by contacting gaseous silicon monoxide with an essentially pure inert gas under substantially nonturbulent conditions, preferably under conditions of lamellar flow, and condensing said monoxide gas in the presence of said inert gas, substantially fibrous, finely-divided or particulate, solid silicon-monoxide compositions having a large surface area are obtained. A minor amount of the composition may consist of spherical particles. While the fiber-like particles obtained by the present method have about the same length, color, structure and surface area of the prior art "monox," they exhibit a more uniform width and length, show few spherical and horn-like particles mixed therewith and are more tendrilous than when condensing silicon monoxide with an inert gas containing appreciable amounts of available oxygen under turbulent or nonturbulent conditions or when condensing silicon monoxide gas in a vacuum. Moreover, by virtue of the use of the method and apparatus disclosed herein it is possible to continuously produce solid, particulate, substantially fibrous silicon monoxide at atmospheric pressures avoiding the need for repeated shutdown and removal of product, recharging, and evacuation of the apparatus. Furthermore, extensive sealing of the apparatus to maintain extremely low pressures or a vacuum is not required as the flowing inert gas tends to keep out the oxygen of the atmosphere and extra reinforcement to withstand high pressures and the use of cooling water are also not required. A feature of this invention is that the fibrous product produced as disclosed herein contains essentially no silicon carbide.

As shown in the drawing Figs. 1 and 2 charge 1 of essentially equal moles of silica and carbon are subjected to arc 2 between electrodes 3—3, connected to a suitable source of electric power not shown, passing through walls 4—4 of the furnace, generally indicated at 5. The walls of the furnace are suitably insulated and strengthened and the electrodes are insulated from the walls, desirably cooled and may be attached to means to feed them continuously into the furnace chamber as they are consumed in accordance with practices well known in the art. The reaction which takes place in the furnace is represented as follows:

$$SiO_2 + C \xrightarrow[\text{or higher}]{\text{about 1500-2000° C.}} SiO\uparrow + CO\uparrow$$

The top 6 of the furnace contains port 7 through which the silicon monoxide and carbon monoxide gases resulting from the reaction pass to generally L-shaped chamber or tube 8 surrounded by enclosed chamber 9. The sides of chamber 9 contain inlet tubes 10—10 permitting the entry of an inert gas such as essentially pure nitrogen gas from sources (not shown) such as nitrogen gas cylinders and which fills the chamber uniformly and flows from the chamber by means of ports 11—11 in the base thereof which register with ports 12—12 in the base of the tube 8 to mix with the silicon monoxide and carbon monoxide issuing from the furnace with a minimum of turbulence. Flow regulating valves 13—13 control the entry of the nitrogen into the system. The mixture of gaseous nitrogen, condensed silicon monoxide and carbon monoxide is delivered in collecting chamber 15 where the fibrous product 16 is deposited on V-shaped screen 17 and the carbon monoxide and nitrogen gases are discharged to the atmosphere by means of pipes 18 and 19 and valve 20 or led to suitable gas collecting apparatus for further use. While most of the silicon monoxide gas will condense to a solid product in tube 8 and be carried by the gases to collector 15, some of it may condense in the collector 15. Instead of the collector 15 being of rigid construction it may be a gas previous bag or other collecting means such as a cyclone type collector, etc. In place of an arc furnace, a resistance furnace or other high temperature furnace may be used. Accordingly, it is seen that the inert gas enters the condensing tube to provide a cone like envelope of inert gas rising about the silicon monoxide gas to disperse into the silicon monoxide gas to condense the same to form fibrous particles.

As the reaction in the furnace proceeds the coke and silica are consumed, and fresh supplies are introduced by screw conveyors 21—21 powered by electric motors (not shown). They deliver a premixed aggregate 22—22 of sand and coke from hoppers 23—23 to the furnace intermittently or continuously as the sand and coke in the furnace proper are consumed and also to force the aggregate in the furnace in close proximity to the arc to reduce radiation losses and to provide better reaction. The fibrous silicon monoxide 16 in collector 15 can be withdrawn continuously by means of screw conveyor 24 suitably powered by an electric motor and deposited in hopper 25 from which it may be removed to storage. Sliding gate 26 is designed to be moved across the interior of the hopper to provide a seal when removing the solid silicon monoxide. Instead of venting the nitrogen and carbon monoxide gases to the atmosphere, they can be saved and reused by being returned to chamber 9 and condensing tube 8 by means of conduits 27, 28 and 10—10. If too much gas is being fed back to the system, it can be vented to the atmosphere or fed to a separate collecting system by means of conduit 19 which contains valve 20. Valve 20 may also be a relief valve to permit excess gas under pressure to be automatically vented in order to avoid build up of gas pressure which might rupture parts of the apparatus or slow down or stop the reaction in the furnace. Valves 31, 32, 33 and 34 control the flow of gases in the conduits leading back to conduits 10—10 and chamber 9. Flow meters 35 and 36 are placed in conduits 27 and 28 to determine the flow of the gases and thereby enable ready adjustment of the flow as needed. If fresh nitrogen gas is required in the system, it may be introduced by opening valves 13—13 in conduits 10—10 while shutting off or reducing the flow of gas in the other conduits by entirely or partially closing the valves or venting the gases to the atmosphere.

It is seen that in the operation of the apparatus shown and described it is possible to continuously feed raw material to the furnace and withdraw silicon monoxide from the collecting chamber while the inert gas or gases are continuously circulated throughout the system. Once the ratio of essentially pure inert condensing gas to silicon monoxide gas has been established in a continuous process using recirculating gases, additional inert gas from outside the system is not required and inert gas to compensate for that produced by the reaction in the furnace can be vented or bled off as desired to avoid excess pressures. Moreover, the carbon monoxide produced in the system can be used to replace gradually essentially all of the nitrogen by careful bleeding or venting of the inert gases from the system. Accordingly it also is possible in such cases initially to start the system with a commercial grade of inert gas, for, after the system has been operating continuously for awhile, it will be operating under an essentially pure inert atmosphere, that is, it will be essentially free of available oxygen. The products, however, produced initially by the latter method will be of a poorer grade and less desirable due to oxidation of some of the SiO to $SiO_2$. Some additional inert gas may be necessary, of course, to compensate for possible leaks in the apparatus. Moreover, by proper adjustment of the valves of the gas conveying systems and control of the furnace feed rate of the apparatus described, it is possible to maintain the issuance of the SiO gas into the condensing chamber at a fixed rate as well as to maintain the issuance of the inert gas into the same chamber at a fixed rate to obtain continuously a silicon monoxide mixture of a generally fixed particle size range with the only fresh material added to the system being the coke and sand charge. The electrodes may also be continuously supplied to the furnace so that the process need not be stopped to replenish electrodes. Accordingly, shutdown of operations need only occur when repairing the furnace lining and so forth.

It, of course, is apparent that the methods and types of apparatus disclosed by the present invention and their details can be varied considerably with obtainment of satisfactory results. For example the series of ports 11—12 between chamber 9 and condensing tube 8 may be entirely replaced with an open ring or pipes from the inert gas supply can be placed directly about port 7 leading from the furnace and positioned to direct a column of inert gas upwards substantially parallel to the inflowing silicon monoxide gas stream to provide lamellar flow. While it is possible to introduce the condensing gases into the furnace proper about the port 7 to mix with the silicon monoxide gas, it is less desirable as such procedure tends to create turbulence and to reduce the efficiency of the furnace. In place of a screw conveyor other feeding means such as a ram operated by a solenoid or hydraulically can be used to force fresh aggregate or mix 22 into the furnace. Pumps may also be interposed in the gas lines to increase the rate of flow if desired.

The silica used in the arc reduction process may be sand, quartz, or mineral silicates which do not contain impurities which would volatilize during the reaction or form products which would adversely affect the properties of the fibrous silicon monoxide. The carbon may be anthracite, carbon black, coal or petrolum coke essentially free of volatiles and other matter which would provide deleterious amounts of impurities. Silicon metal or silicon carbide may also be used in place of carbon in the reduction process. However, it is preferred to use coke or carbon, in order to obtain the highest yields of silicon monoxide. While mol ratios of 1:1 sand to coke are generally used in the furnace, these ratios may be varied somewhat with obtainment of satisfactory results. However, wide variations in mole ratios are not desired as such may tend to reduce the amount of product obtained while increasing the amounts of CO and tending to product SiC.

The inert gas used in contacting and condensing the silicon monoxide vapor emanating from the furnace may be carbon monoxide, nitrogen, argon, helium, neon and the like. Mixtures of these inert gases may also be used.

It will be appreciated that where a reduction process employing carbon is used, CO may also be evolved with the SiO gas. However, additional CO is necessary to provide for the proper dilution and condensation of the SiO in the system. The inert gas should be free of available oxygen, that is, free of oxygen available for oxidizing the silicon monoxide gas to silicon dioxide before or during condensation. For example oxygen can be combined in $CO_2$ or $H_2O$ and still be available for oxidation. Yet oxygen in CO is not available for oxidation. Accordingly, the inert gas should be essentially pure, that is, it should contain not more than a fraction of a percent of oxygen and preferably not more than a few parts of oxygen per million parts of the inert gas. For example, if commercial varieties of inert gas containing about 0.5% oxygen are used, the amount and length of the fibers will be appreciably reduced.

The essentially pure inert gas should be introduced into the silicon monoxide gas stream at a low velocity to mix with the silicon monoxide gas under conditions substantially free of turbulence. High velocities are to be avoided since they create turbulence in the cooling gases to prevent the formation of fibrous products. While obviously some minor turbulence will occur when the silicon monoxide gas stream contacts the incoming inert gas stream, it should be kept at a minimum. Likewise, it is apparent that some turbulence will occur in the layers of the gas stream adjacent the walls of the apparatus or where there are protuberances. Accordingly, the silicon monoxide gas and the condensing gas should flow at a sufficiently slow rate and should meet each other at small angles of contact and the apparatus should contain a minimum number of protuberances so that the flow is substantially non turbulent. Preferably, the inflowing inert condensing gas should form a column about the silicon monoxide gas as it issues from the furnace to provide gas flow essentially in the same direction or lamellar flow which is essentially free of turbulence. The ratio of silicon monoxide gas produced to inflowing inert condensing gas can vary from 1:3 to 1:15 to provide a large volume in which the SiO gas can disperse and condense and preferably should be about 1:8. It has been found that nitrogen at a rate of 40 ft.$^3$ per minute contacting SiO gas, produced at a rate of about 8 ft.$^3$/min., will produce about 10 pounds per hour of the fibrous product of the present invention.

The following examples will serve to illustrate the invention with more particularity to those skilled in the art.

EXAMPLE I

One mol each of sand and coke were charged to an arc furnace which was closed except for an opening in its top to permit the gaseous reaction product to escape to a condensing chamber containing 5 ports for entry of the inert condensing gas and symmetrically positioned about the opening in the furnace top. The condensing chamber was connected in turn to a bag collector. The system was flushed with pure nitrogen (Nela Park nitrogen containing only a few parts of oxygen per million) and kept at atmospheric pressure. An arc was struck to initiate reaction between the coke and sand, and, as the gaseous silicon monoxide evolved at a rate of 1½ li./min., it was mixed with the pure nitrogen at a rate of 20 liters per minute without causing appreciable turbulence. After the run was completed, the product obtained was removed from the collector bag and examined. It had a surface area of about 79 m.$^2$/g., and was substantially in the form of fibers which had a ratio of width to length of from 1 to 18. The fibers had an average fiber length of about 250 millimicrons with a range of about 80 to 300 millimicrons. On the other hand, when the same procedure was followed except that commercial nitrogen containing about 0.5% oxygen was used, the produce had a surface area of 73.5 m.$^2$/g., and the fibrous particles in the product had an average particle size of about 50 millimicrons with a range of 20 to 80 millimicrons. A considerable proportion of spherical particles were mixed with the fibers in the product. These results disclose that the oxygen present in commercially available inert or condensing gases tends to prevent formation of fibrous particles. While the surface area of these particles may be similar, superior reinforcing properties in rubber are obtained when the highly fibrous products are used.

EXAMPLE II

The procedure followed in this example was the same as set forth in Example I, above, except that variations were made in the flow rates of the condensing gases and in the types of gases used. The result of the tests are shown in Table A below:

Table A.—Variations in gases and gas rates

| Run No. | Condensing Inert Gases | Inflow Rate of Condensing Gases | Surface Area of Condensed SiO, m.$^2$/g. | Percent Fibrous | Ratio of Width to Length of Fibers |
|---|---|---|---|---|---|
| 1 | N$_2$(Commercial). | 40 li./min. | 92 | 20 | 1 to 6 |
| 2 | N$_2$(Commercial). | High velocity Jets. | 214 | none | 1 to 1 |
| 3 | Air. | High velocity Jets at 9 p.s.i. 20 gauge needles. | 134.7 | 5 | 1 to 2 |
| 4 | N$_2$(Commercial). / CO$_2$ | 10 li./min. / 10 li./min. | 99 | none | 1 to 1 |
| 5 | N$_2$(Commercial). / CO$_2$ | 18 li./min. / 2 li./min. | 121 | 15 | 1 to 1 |

The above data indicate that high velocity input of condensing gases which cause turbulence in the mixing gas streams will afford high surface area but will fail to produce the requisite fibrous structure desired in the particles. Moreover, air or mixtures of nitrogen with $CO_2$, normally considered inert, will not produce a fibrous structure according to the present invention. Apparently the carbon dioxide does have oxygen available for oxidation.

EXAMPLE III

The method of this example was the same as Example I, above, except that 20 li./min. of essentially pure CO gas was used in place of pure N$_2$. The resulting product had an average fiber length of about 300 millimicrons, maximum about 520 millicrons, and was substantially entirely fibrous. The particles had a surface area of about 111 m.$^2$/g. and a ratio of width to length of about 1 to 40.

The fibrous, finely-divided product of the present invention is particularly useful in the reinforcement of mechanical rubber goods, tire compositions, shoe soling and other rubbery materials; it also can be used to produce hard, strong rubber products having excellent electrical insulation properties. Moreover, it can be employed as a filler in sound and heat insulating compositions.

In summary, the present invention teaches that a condensed solid, substantially fibrous silicon monoxide can readily be prepared by contacting and condensing silicon-monoxide gas in the presence of an essentially pure inert gas without turbulence. By means of the apparatus disclosed herein a continuous stabilized system can be established to recirculate the inert gas produced in the reaction back to the condensing chamber and to provide for a standardized silicon monoxide mixture. Once the system has been operating for a short time it is only necessary to feed the charge of sand and coke, replenish electrodes, and remove product. The present invention thus obviates the batch wise operations of the prior art with its attendant difficulties of cleaning out the furnace, recharging, evacuation and separate collection.

What is claimed is:

1. In the method of making a particulate, solid product comprising silicon monoxide by reacting a silicon-containing material selected from the group consisting of silica, sand, quartz and mineral silicates at elevated temperatures to produce a silicon-monoxide gas stream and then cooling said gas stream outside of the reaction zone, the step comprising cooling said silicon-monoxide gas stream in an essentially pure condensing gas stream inert to said silicon monoxide gas under substantially nonturbulent conditions to condense said silicon monoxide gas to form a particulate, solid silicon-monoxide product having the general formula $$[(Si)_x \cdot (SiO_2)_y]$$

where $x$ and $y$ are whole numbers and containing a substantial amount of fibers.

2. In the method of making a particulate, solid product comprising silicon-monoxide by reducing a silicon-containing material selected from the group consisting of silica, sand, quartz and mineral silicates at elevated temperatures with a reducing agent to produce silicon monoxide gas and then condensing said gas outside of the reduction zone, the step comprising mixing said silicon-monoxide gas with an essentially pure condensing gas inert to said silicon monoxide gas at a rate sufficient to provide lamellar flow essentially free of turbulence to condense said silicon-monoxide gas to form a solid, particulate silicon-monoxide product having the general formula $$[(Si)_x \cdot (SiO_2)_y]$$

where $x$ and $y$ are whole numbers and containing a substantial amount of fibers having an average particle length of from about 50 to 600 millimicrons, a surface area of from about 60 to 200 square meters per gram and a structure in which the ratio of width to length is from about 1:10 to 1:50.

3. In the method according to claim 2, essentially pure nitrogen gas as said condensing gas.

4. In the method according to claim 2, essentially pure carbon monoxide gas as said condensing gas.

5. In the method according to claim 2, essentially pure argon gas as said condensing gas.

6. In the method according to claim 2, essentially pure neon gas as said condensing gas.

7. In the method according to claim 2, essentially pure helium gas as said condensing gas.

8. In the method of making a particulate, solid product comprising silicon monoxide by reacting silicon-containing materials selected from the group consisting of silica, sand, quartz and mineral silicates at sufficiently elevated temperatures of at least about 1500 to 2000° C. in a first zone to produce silicon-monoxide gas and then condensing said gas to form a solid, the steps comprising delivering said silicon-monoxide gas to a second zone, mixing said silicon-monoxide gas in said second zone with an essentially pure condensing gas inert to said silicon monoxide gas in a volume flow ratio of from 1:3 to 1:15 to provide lamellar flow essentially free of turbulence to condense said silicon-monoxide gas to form a particulate, solid silicon-monoxide product having the general formula $$[(Si)_x \cdot (SiO_2)_y]$$

where $x$ and $y$ are whole numbers and containing a substantial amount of fibers having an average particle length of from about 50 to 600 millimicrons, a surface area of from about 60 to 200 square meters per gram and a structure in which the ratio of width to length is from about 1:10 to 1:50, and separating said solid silicon-monoxide product from said inert gas.

9. In the method of making a particulate, solid product comprising silicon monoxide by reacting a silicon-containing material selected from the group consisting of silica, sand, quartz and mineral silicates at sufficiently elevated temperatures of at least about 1500 to 2000° C. in a first zone in the presence of a carbonaceous reducing agent to produce silicon-monoxide gas, and then condensing said gas to form a solid, the steps comprising delivering said silicon-monoxide gas to a second zone, introducing in said second zone an enveloping column of essentially pure condensing gas inert to said silicon monoxide gas about said silicon-monoxide gas to mix with said silicon-monoxide gas and form a gas stream exhibiting lamellar flow essentially free of turbulence, the ratio of the volume of flow of the silicon monoxide gas to the inert gas being about 1:8, said silicon-monoxide gas condensing in the presence of said inert gas to form a particulate, solid silicon-monoxide product having the general formula $$[(Si)_x \cdot (SiO_2)_y]$$

where $x$ and $y$ are whole numbers and containing a substantial amount of fibers having an average particle length of from about 50 to 600 millimicrons, a surface area of from about 60 to 200 square meters per gram and a structure in which the ratio of width to length is from about 1:10 to 1:50, separating said solid silicon-monoxide product from said inert gas, recirculating said inert gas separated from said solid silicon monoxide product to the system to mix with fresh silicon monoxide gas in said second zone and feeding a fresh mixture of said silicon-containing material and carbonaceous reducing agent to said first zone to be reacted to form more silicon-monoxide gas.

10. In the method of making a particulate, solid product comprising silicon monoxide by reacting silicon-containing materials selected from the group consisting of silica, sand, quartz and mineral silicates at sufficiently elevated temperatures of at least about 1500 to 2000° C. in a first zone to produce silicon-monoxide gas and then condensing said gas to obtain a solid, the improvement comprising delivering said silicon-monoxide gas to a second zone, mixing and cooling said silicon-monoxide gas in said second zone with a condensing gas inert to said silicon monoxide gas and being essentially free of available oxygen in a volume flow ratio of from 1:3 to 1:15 under substantially non-turbulent conditions to condense said silicon-monoxide gas to form a particulate, solid silicon-monoxide product having the general formula $$[(Si)_x \cdot (SiO_2)_y]$$

where $x$ and $y$ are whole numbers and containing a substantial amount of fibers having an average particle length of from about 50 to 600 millimicrons, a surface area of from about 60 to 200 square meters per gram and a structure in which the ratio of width to length is from about 1:10 to 1:50, and separating said solid silicon-monoxide product from said inert gas.

11. In the method of making a particulate, solid product comprising silicon monoxide by reacting a silicon-containing material selected from the group consisting of silica, sand, quartz and mineral silicates at sufficiently elevated temperatures of at least about 1500 to 2000° C. in a first zone in the presence of a carbonaceous reducing agent to produce silicon-monoxide gas and then condensing said gas to obtain a solid, the improvement comprising continuously reacting said silicon-containing material and reducing agent to produce silicon monoxide gas, continuously delivering said silicon-monoxide gas to a second zone, continuously enveloping said silicon monoxide gas in said second zone with an essentially pure condensing gas inert to said silicon-monoxide gas to mix with said silicon-monoxide gas and form a gas stream exhibiting lamellar flow essentially free of turbulence, said silicon-monoxide gas cooling and condensing in the presence of said inert gas to form a particulate, solid silicon-monoxide product having the general formula $$[(Si)_x \cdot (SiO_2)_y]$$

where $x$ and $y$ are whole numbers and containing a substantial amount of fibers having an average particle length of from about 50 to 600 millimicrons, a surface area of from about 60 to 200 square meters per gram and a structure in which the ratio of width to length is from about 1:10 to 1:50, and continuously separating said solid silicon-monoxide product from said condensing gas.

12. In the method of making a particulate, solid product comprising silicon monoxide by reacting a silicon-containing material selected from the group consisting of silica, sand, quartz and mineral silicates at a temperature of at least about 1500 to 2000° C. in a first zone in the presence of a carbonaceous reducing agent to produce silicon monoxide gas and then condensing said gas to form a solid, the improvement comprising delivering said silicon monozide gas to a second zone, enveloping said silicon monoxide gas at a small angle of contact in said second zone with an essentially pure condensing gas inert to said silicon monoxide gas to mix with said silicon monoxide gas and form a gas stream exhibiting lamellar flow essentially free of turbulence, the volume flow ratio of said silicon monoxide gas produced to said inflowing condensing gas being from 1:3 to 1:15, and to cool and condense said silicon monoxide gas to form a solid silicon monoxide product having the general formula $$[(Si)_x \cdot (SiO_2)_y]$$

where $x$ and $y$ are whole numbers and containing a substantial amount of fibers and separating said solid silicon monoxide product from said condensing gas.

13. In the method of making a particulate, solid product comprising silicon monoxide by reacting a silicon-containing material selected from the group consisting of silica, sand, quartz and mineral silicates at elevated temperatures to produce a silicon monoxide gas stream and then condensing said gas stream outside of the reaction zone, the step comprising adding an essentially pure condensing gas stream inert to said silicon monoxide gas to the stream of silicon monoxide gas in an amount sufficient to cool said silicon monoxide gas under substantially nonturbulent conditions to form a particulate, solid silicon-monoxide product having the general formula $$[(Si)_x \cdot (SiO_2)_y]$$

where $x$ and $y$ are whole numbers and containing a substantial amount of fibers.

14. In the method of making a particulate, solid product comprising silicon monoxide by reacting a silicon containing material selected from the group consisting of silica, sand, quartz and mineral silicates at elevated temperatures to produce a silicon-monoxide gas stream and then condensing said gas stream outside of the reaction zone, the step comprising enveloping said stream of silicon-monoxide gas with a stream of at least one essentially pure condensing gas inert to said silicon monoxide gas at a rate sufficient to provide lamellar flow essentially free of turbulence to cool and condense said silicon-monoxide gas to form a solid, particulate silicon-monoxide product having the general formula $$[(Si)_x \cdot (SiO_2)_y]$$

where $x$ and $y$ are whole numbers and containing a substantial amount of fibers.

References Cited in the file of this patent

UNITED STATES PATENTS

| | | |
|---|---|---|
| 875,286 | Potter | Dec. 31, 1907 |
| 886,636 | Potter | May 5, 1908 |
| 908,131 | Potter | Dec. 29, 1908 |
| 993,913 | Tone | May 30, 1911 |
| 1,104,384 | Potter | July 21, 1914 |
| 2,556,424 | Hasche | June 12, 1951 |
| 2,588,853 | Kumins et al. | Mar. 11, 1952 |
| 2,613,137 | Hellwig | Oct. 7, 1952 |
| 2,653,859 | Glaeser | Sept. 29, 1953 |
| 2,715,060 | Barry | Aug. 9, 1955 |

UNITED STATES PATENT OFFICE
CERTIFICATE OF CORRECTION

Patent No. 2,823,979                             February 18, 1958

Daniel S. Sears

It is hereby certified that error appears in the printed specification of the above numbered patent requiring correction and that the said Letters Patent should read as corrected below.

Column 5, line 72, for "produce" read -- product --; column 6, line 34, Table A, last column thereof, last line, for "1 to 1" read -- 1 to 3 --.

Signed and sealed this 7th day of October 1958.

(SEAL)
Attest:

KARL H. AXLINE
Attesting Officer

ROBERT C. WATSON
Commissioner of Patents